US012770472B2

(12) United States Patent
Haushalter et al.

(10) Patent No.: US 12,770,472 B2
(45) Date of Patent: Oct. 20, 2026

(54) METHODS AND SYSTEM FOR PROVIDING AN ONLINE CASINO GAME

(71) Applicant: Evolution Malta Limited, St. Julians (MT)

(72) Inventors: Todd Haushalter, Las Vegas, NV (US); Anete Grigorjeva, Riga (LV); Tomass Dimza, Ropažu nov (LV); Alexander Dougal John Goodman, Riga (LV)

(73) Assignee: Evolution Malta Limited, St. Julians (MT)

( * ) Notice: Subject to any disclaimer, the term of this patent is extended or adjusted under 35 U.S.C. 154(b) by 240 days.

(21) Appl. No.: 18/433,012

(22) Filed: Feb. 5, 2024

(65) Prior Publication Data

US 2025/0252820 A1 Aug. 7, 2025

(51) Int. Cl.
*G07F 17/32* (2006.01)

(52) U.S. Cl.
CPC ...... *G07F 17/3267* (2013.01); *G07F 17/3213* (2013.01); *G07F 17/3225* (2013.01)

(58) Field of Classification Search
CPC ............. G07F 17/3267; G07F 17/3286; G07F 17/3288; G07F 17/34
See application file for complete search history.

(56) References Cited

U.S. PATENT DOCUMENTS

2009/0325686 A1* 12/2009 Davis ...................... G07F 17/32 463/25
2013/0059638 A1* 3/2013 Nicely .................... G07F 17/34 463/17

FOREIGN PATENT DOCUMENTS

AU 2014218480 A1 * 9/2014

* cited by examiner

*Primary Examiner* — Steven J Hylinski
(74) *Attorney, Agent, or Firm* — Quarles & Brady LLP

(57) ABSTRACT

Methods and systems for online casino games and related aspects are disclosed. An example method includes transmitting a data stream of online casino game content to a remote electronic device; registering wagers on one or more outcomes out of a set of possible outcomes of the online casino game based on data received from the remote electronic device; randomly assigning bonus elements for a subset of outcomes out of the set of possible outcomes, wherein each bonus element is associated with a bonus game; in response to an auxiliary wager being registered on a bonus catcher field comprised in the online casino game content, registering the auxiliary wager on each of the outcomes having assigned bonus elements; and outputting a winning outcome out of the set of possible outcomes based on a random number generation.

20 Claims, 8 Drawing Sheets

METHODS AND SYSTEM FOR PROVIDING AN ONLINE CASINO GAME

TECHNICAL FIELD

The disclosed technology relates to methods and systems for providing an online casino game to one or more user devices. In particular, but not exclusively, the disclosed technology relates to an online casino game with a bonus catcher option providing a guarantee to bet on outcomes associated with bonuses.

BRIEF DESCRIPTION OF THE DRAWINGS

Various aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

Figure 1:
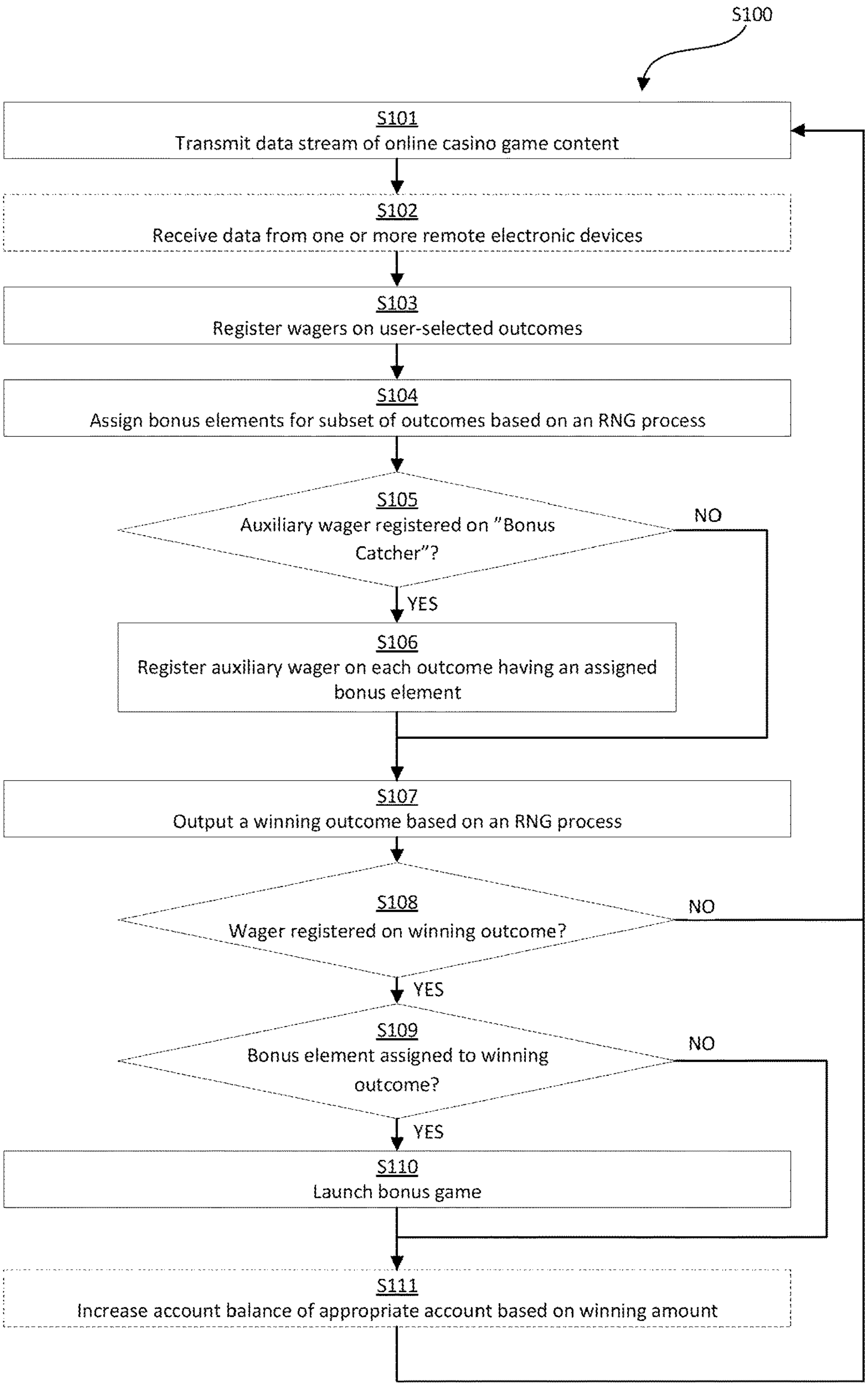
FIG. 1 is a schematic flowchart representation of a method for providing an online casino game in accordance with some embodiments.

In recent years, the online casino industry has experienced significant growth and innovation, driven by advancements in technology and an increasing demand for engaging and immersive gaming experiences. One key area of focus has been the development of new and captivating casino games that not only entertain but also provide players with enhanced opportunities for winning, while incorporating technology to ensure fair play and secure transactions, maintaining the integrity of the gaming environment. The online casino games may utilize random number generators (RNGs), encryption protocols, and other cutting-edge measures to guarantee a trustworthy and enjoyable experience for players.

Traditional online casino games typically consist of a base game with standard features, offering players a straightforward gaming experience. However, there is a growing need for novel and inventive games that go beyond the conventional model, incorporating elements that heighten excitement and engagement. To this end many online casino game systems combine a compelling base game with strategically designed bonus games. The objective is to provide players with a multifaceted and dynamic gaming experience, enhancing their overall enjoyment while increasing the potential for substantial winnings.

The base game serves as the foundation for the online casino experience, oftentimes featuring a user-friendly interface and captivating graphics to draw players into the gaming environment. The game mechanics are designed to be intuitive, ensuring accessibility for both novice and experienced players. Additionally, the base game incorporates a variety of elements such as symbols, reels, and/or pay-lines, maintaining the familiarity of traditional casino games while introducing unique and entertaining twists. Complementing the base game, a series of bonus games that are strategically integrated into the overall gameplay are introduced. These bonus games are triggered by specific in-game events or combinations, providing players with additional opportunities to win prizes, free spins, or other enticing rewards. The bonus games are carefully designed to enhance player engagement, offering thematic variations and interactive features that captivate the user's attention and prolong their gaming experience.

However, there is still a need for new and innovative online casino game solutions that elevate the player experience, encourage prolonged engagement, and contribute to the continued growth and evolution of the online casino industry.

The herein disclosed technology seeks to mitigate, alleviate or eliminate one or more of the deficiencies and disadvantages in the prior art to address various problems relating to player experience and player engagement for Random Number Generation (RNG) based casino games.

It is another object of some embodiments disclosed herein to provide an improved online casino game having a base game and one or more bonus games. In particular, it is an object of some embodiments to provide an online casino game that provides an option for a player to be guaranteed a chance to play the bonus games in the event that the winning outcome is a bonus game.

Various aspects and embodiments of the disclosed technology are defined below and in the accompanying independent and dependent claims.

A first aspect of the disclosed technology comprises a computer-implemented method for providing an online casino game. The method comprises, by one or more processors of a (game) server, transmitting a data stream of online casino game content to a remote electronic device comprising a display apparatus and a user input device. The method further comprises, by the one or more processors of the server, for each game round of the online casino game registering wagers on one or more outcomes out of a set of possible outcomes of the online casino game based on data received from the remote electronic device, randomly assigning bonus elements for a subset of outcomes out of the set of possible outcomes, wherein each bonus element is associated with a bonus game, in response to an auxiliary wager being registered on a bonus catcher field comprised in the online casino game content, registering the auxiliary wager on each of the outcomes having assigned bonus elements, outputting a winning outcome out of the set of possible outcomes based on a random number generation.

Another aspect of the disclosed technology comprises a computer program product. The computer program product comprises instructions which, when the program is executed by a computer, causes the computer to carry out the method according to any one of the embodiments disclosed herein. With this aspect of the disclosed technology, similar advantages and preferred features are present as in the other aspects.

Another aspect of the disclosed technology comprises a (non-transitory) computer-readable storage medium. The computer-readable storage medium comprises instructions which, when executed by a computer, causes the computer to carry out the method according to any one of the embodiments disclosed herein. With this aspect of the disclosed technology, similar advantages and preferred features are present as in the other aspects.

The term "non-transitory," as used herein, is intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Another aspect of the disclosed technology comprises a system for providing a casino game. The system comprises a server comprising one or more processors configured to transmit a data stream of online casino game content to a remote electronic device comprising a display apparatus and a user input device. The one or more processors are further configured to, for each game round of the online casino game, register wagers on one or more outcomes out of a set of possible outcomes of the online casino game based on data received from the remote electronic device, randomly assign bonus elements for a subset of outcomes out of the set of possible outcomes, wherein each bonus element is associated with a bonus game, in response to an auxiliary wager being registered on a bonus catcher field comprised in the online casino game content, register the auxiliary wager on each of the assigned bonus elements, output a winning outcome out of the set of possible outcomes based on a random number generation.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

An advantage of some embodiments is that there is provided a functionality to guarantee that the player has a bet on all available "bonus outcomes" for a game round without forcing the player to bet on every possible outcome in that game round, thereby providing an elevated gaming experience.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services, and functions explained herein may be implemented using individual hardware circuitry, using software functioning in conjunction with a programmed microprocessor or general-purpose computer, using one or more Application Specific Integrated Circuits (ASICs), using one or more Field Programmable Gate Arrays (FPGA) and/or using one or more Digital Signal Processors (DSPs).

In the following description of exemplary embodiments, the same reference numerals denote the same or similar components. In some of the illustrated embodiments the same or similar components have not all been provided with reference numerals so to avoid unnecessary cluttering of the drawings. However, such obvious considerations are readily understood and appreciated by the skilled person in the art and should not be construed as limiting to the or in any other way have a negative impact on the present disclosure.

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

As mentioned, many online casino game systems combine a compelling base game with strategically designed bonus games. The objective is to provide players with a multifaceted and dynamic gaming experience, enhancing their overall enjoyment while increasing the potential for substantial winnings. For a Random Number Generation/Generator (RNG) based game, this may mean that some of the possible outcomes (e.g., wheel numbers) also have a bonus game randomly assigned thereto. Should the result then be that the winning outcome is one of the outcomes having a bonus game assigned thereto, then the player is awarded to play the bonus game based on the amount that was bet on the winning outcome in order to get a chance to gain some extra winnings. Therefore, many players try place bets on outcomes that they believe will be assigned a bonus game as the potential for substantial winnings increase. However, conventionally, the only way to guarantee that you will have a bet on the outcomes that are assigned a bonus game is to bet on all numbers.

Therefore, some embodiments herein introduce a possibility make an "auxiliary wager" (or "auxiliary bet") on a "bonus catcher field" that guarantees the player that they will have a bet placed on every "bonus outcome" once they have been assigned. However, the cost for placing the auxiliary wager is not the wager amount, but rather a cost that is calculated based on a Return-To-Player (RTP) for the underlying game. In more detail, the cost calculation may be performed by looking at the allocation of the event (in this case the bonuses) as a proportion of the total RTP in the game, and then calculated accordingly. Doing it in this way means that the auxiliary bet itself is RTP-neutral (i.e., it mirrors the RTP of the bet spot that it is coexisting with). For example, for an RNG game having 20 possible outcomes, for which 3-8 bonus games will be randomly assigned, the cost for making the "auxiliary wager" (i.e., the "bonus catcher" wager) may be 11.4 units. In other words, to ensure that you will have 1 betting unit placed on all outcomes having a bonus game assigned thereto, the cost will be 11.4 betting units.

An advantage of some embodiments is that players are given a possibility to always have a wager on all potential bonus game outcomes in an RNG-based game without having to place a wager on every possible outcome of the game. Thereby they obtain an increased potential for substantial winnings at a reduced monetary risk.

FIG. 1 is a schematic flowchart representation of a method S100 for providing a live game in accordance with some embodiments. In particular, the method S100 is suitable for executing a live online casino game, such as a live online casino RNG game (e.g., vertical wheel game, roulette, etc.), for a one or more remote electronic devices. The method S100 is preferably a computer-implemented method S100, performed by a computing device (e.g., a game server). The computing device (e.g., game server) may for example comprise one or more processors and one or more memories coupled to the one or more processors, wherein the one or more memories store one or more programs that cause the computing device to perform the steps, services, and functions of the method S100 disclosed herein when executed by the one or more processors.

The method S100 may comprise, by one or more processors of a server, transmitting S101 a data stream of online casino game content to a remote electronic device comprising a display apparatus and a user input device. The data stream may comprise a live video stream of a casino game environment. The video stream may for example be a live video feed of a studio where an operator operates a live casino game that is streamed to a plurality of remote electronic devices over a communication network (i.e., over the internet). In some embodiments, the live video stream is augmented with virtual graphical elements (e.g., chips, wagering fields, chat, account balance, etc.) as known in the art. The transmitted S101 data stream causes the remote electronic device to display, via the display apparatus, a graphical user interface comprising a graphical a representation of the live online casino game and the associated graphical elements.

The remote electronic devices may for example be user devices such as smart phones, tablets, personal computers, laptops, or similar. The term "remote" is to be construed as that the electronic devices are remote from a game server associated with the studio where the live casino game takes place. In some embodiments, the method S100 further comprises receiving S102 data from the remote electronic device. The received data may for example comprise requests and acknowledgements for connection and/or communication with the server, user data, user input data, and so forth.

The method S100 further comprises, for each game round of the online casino game, registering S103 wagers on one or more outcomes out of a set of possible outcomes of the online casino game based on data received S102 from the remote electronic device. In other words, during a "bets open" period of the online casino game, the user of the remote electronic device may place bets or wagers on one or more of the set of possible outcomes. Once the user has confirmed their bets, the bets are registered S103. In some embodiments, the placed wagers are registered S103 once the "bets open" period is over (i.e., when the game proceeds to a "bets closed" period). In some embodiments, the method S100 comprises, by the one or more processors, decreasing an account balance of an account associated with the remote electronic device by the sum of the registered S103 wagers.

Further, the method S100 may comprise randomly assigning S104 bonus elements for a subset of outcomes out of the set of possible outcomes, wherein each bonus element is associated with a bonus game. In other words, one or more RNG functions may be executed to assign bonus game to a subset of the possible outcomes of the games. In particular, one RNG function may be used to decide the size of the subset while another RNG function may be used to decide onto which outcomes that the bonus elements should be assigned. For example, in one example scenario, the online casino game may be a vertical wheel game having 20 possible outcomes (e.g., 20 numbers from 1-20). In order to assign S104 the bonus elements, a first RNG function may be used to decide how many bonus elements will be allocated for the current game round (e.g., a number between 3 and 8). Then, assuming that the first RNG function has output the number 5, then 5 bonus elements (with their associated bonus games) will be assigned to 5 of the 20 numbers. Then, a second RNG function may be used to output five random numbers between 1 and 20, and these five random numbers will then have a bonus element assigned S104 thereto. It should be noted that the bonus elements need not necessarily be associated with different bonus games but may be associated with the same bonus game, or some hybrid thereof where for example 3 bonus games are distributed among 5 bonus elements.

Further, the method S100 may comprise, in response to an auxiliary wager being registered S104 on a bonus catcher field comprised in the online casino game content, by the one or more processors, registering S106 the auxiliary wager on each outcome of the subset of outcomes having bonus elements assigned S104 thereto. In other words, the user of the remote electronic device is provided with an option to register a wager at a "bonus catcher" option for a defined cost. The "bonus catcher" option may be understood as a function comprising an interactable graphical element provided in the transmitted online casino game content. Then, if the user has placed a wager on the "bonus catcher" ("auxiliary wager"), that wager is automatically registered S106 to all of the outcomes having a bonus element assigned S104 thereto.

In some embodiments, the auxiliary wager on the bonus catcher field is based on a cost defined by a predefined cost-formula. Accordingly, the method S100 may further comprise, in response to the auxiliary wager being registered on the bonus catcher field, by the one or more processors, decreasing the account balance of the account associated with the remote electronic device by the cost multiplied with the auxiliary wager. Thus, if the cost was 11.4 units, and a 1 USD wager was registered on the bonus catcher field, the account balance is decreased by 11.4 USD.

The method S100 further comprises, by the one or more processors, outputting S107 a winning outcome out of the set of possible outcomes based on a random number generation. The winning outcome is accordingly randomly selected from the set of possible outcomes of the "base game". The base game may as mentioned be a vertical wheel game, a roulette game, or the like. Thus, the random number generation for selecting the winning outcome may be computer-generated RNG or Hardware Random Number Generation (HRNG). In other words, the base game may be a casino game based on a computer-generated RNG or an HRNG.

Further, in some embodiments, the method S100 comprises, in response to a wager being registered S108 on the winning outcome, by the one or more processors, increasing S111 an account balance of an account associated with the remote electronic device based on a value of the registered wager and a prize value of the winning outcome. For example, if the value of the registered wager was 1 USD and the prize value (e.g., given odds) were 1:4, the pay-out is 5 USD (1 USD for the original wager amount and 4 USD for the winning amount).

Moreover, in some embodiments, the method S100 comprises, in response to the winning outcome having a bonus element assigned S109 thereto and a wager being registered S108 on the winning outcome, by the one or more processors, launching S110 the bonus game associated with the bonus element assigned to the winning outcome.

Executable instructions for performing these functions are, optionally, included in a non-transitory computer-readable storage medium or other computer program product configured for execution by one or more processors.

FIGS. 2*a*-2*f* are a series of schematic illustrations of an online casino game in accordance with some embodiments. The illustrations depict an example game interface displayable via the display apparatus of a remote electronic device connected with the game server. More specifically, the series of illustrations show the online casino game through different stages or periods of the game. The game interface may be provided through a transmitted data stream of online casino game content to the remote electronic device.

Furthermore, the online casino game comprises a main game in the form of a large vertical wheel 200 having 20 possible outcomes (set of possible outcomes) in the form of numbers 1 to 20. The wheel can be spun around its centre axis whereupon it stops on a random number between 1 and 20 after some time. The wheel 200 is divided into a number of equal segments separated by spokes or pins. Each segment is associated with a number. The wheel may be a physical wheel that is spun by a dealer, or an animated wheel. The winning segment (winning outcome) is indicated by a pointer that is generally mounted on a flexible piece of rubber or leather, which also rubs against the pins to impart friction and slow the wheel down. Once the wheel has stopped, the segment at the top is the winner. In some embodiments the wheel 200 is a physical wheel and the transmitted data stream comprises a live video feed of the wheel 200. However, in some embodiments the wheel 200 is an animated wheel. The animated wheel may still be provided in conjunction with a live studio and for example be overlaid on the live video stream of the live studio. Moreover, in some embodiments the online casino game comprises a main game in the form of a roulette game.

Figure 2A:
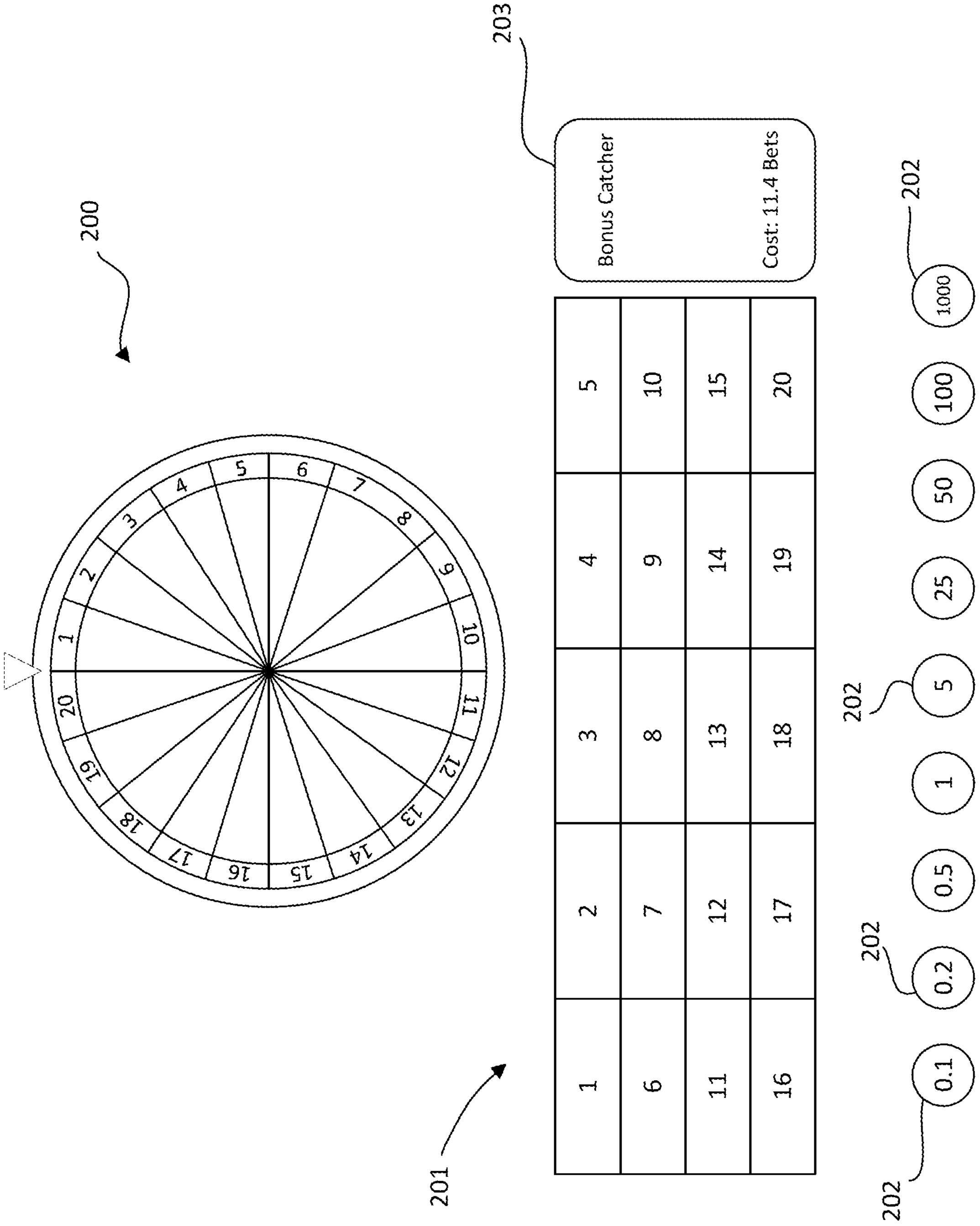
FIGS. 2*a*-2*f* are a series of schematic illustrations of an online casino game in accordance with some embodiments.
Figure 2B:
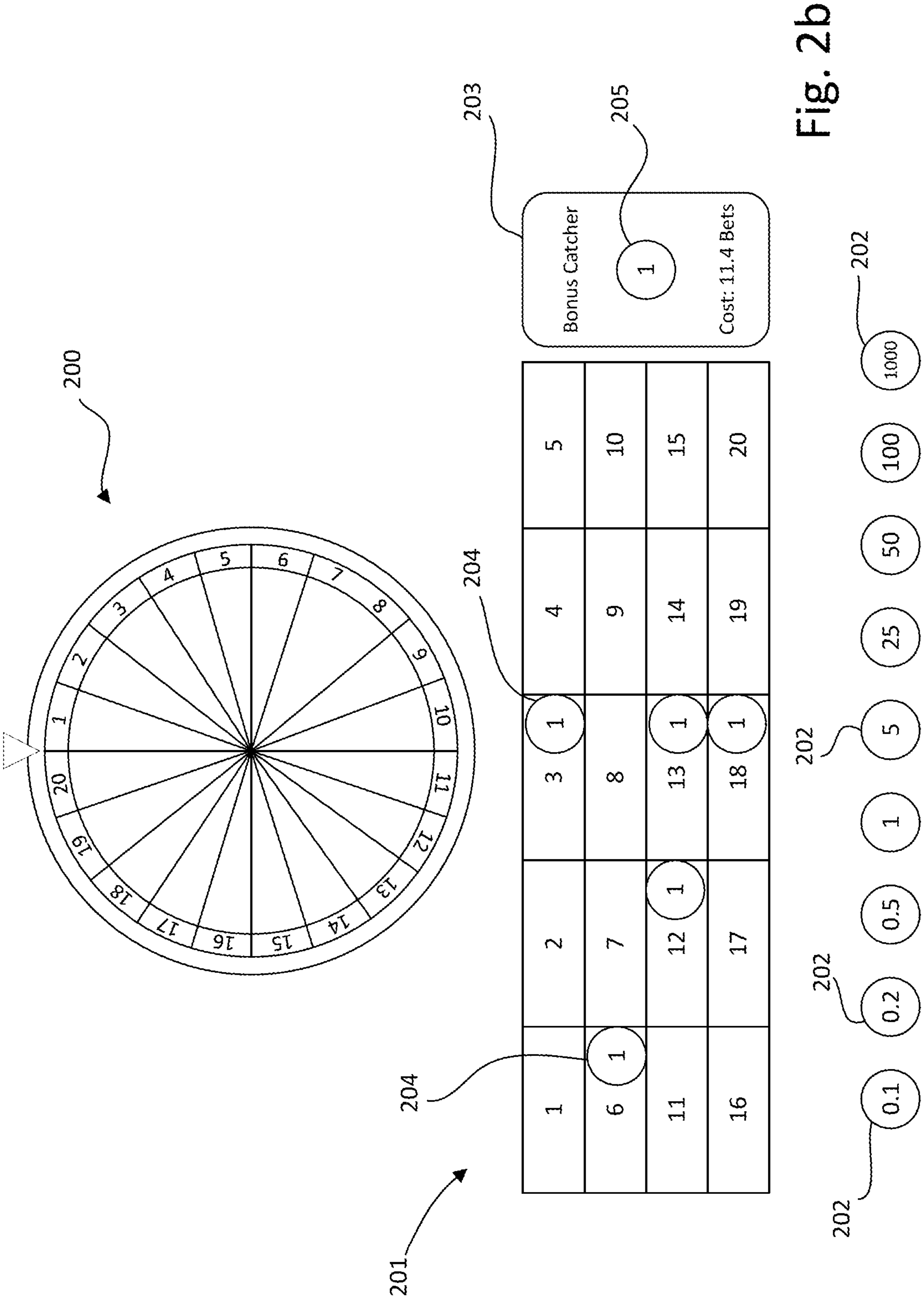

Initially, as depicted in FIG. 2*a* the main game is presented together with some graphical elements indicating possible outcomes 201 upon which a wager can be placed. The size of the wager may be altered by the user of the remote electronic device by selecting the appropriate wager amount (indicated as casino chips 202). Furthermore, the game interface comprises a bonus catcher field 203 upon which a wager may be placed at a cost of 11.4 units/bets as indicated in the figure.

During the initial phase of a game round, there is provided a "bets open" period, during which time, the user/player may place wagers 204, 205 on one or more of the possible outcomes 201 and the bonus catcher field 203. In the depicted embodiment of FIG. 2*b*, wagers 204 have been placed on numbers 3, 6, 12, 13, 18, and on the bonus catcher field. The wager amount totals to 16.4 units (1 unit for each wager 204 on the possible outcomes 201 and 11.4 units for the "auxiliary wager" 205 on the bonus catcher field 203). The one or more processors of the server may be configured to register all of the placed wagers 204, 205 (e.g., upon the expiry of the bets open period), and deduct the appropriate amount from an account balance of the account associated with the remote electronic device.

Figure 2C:
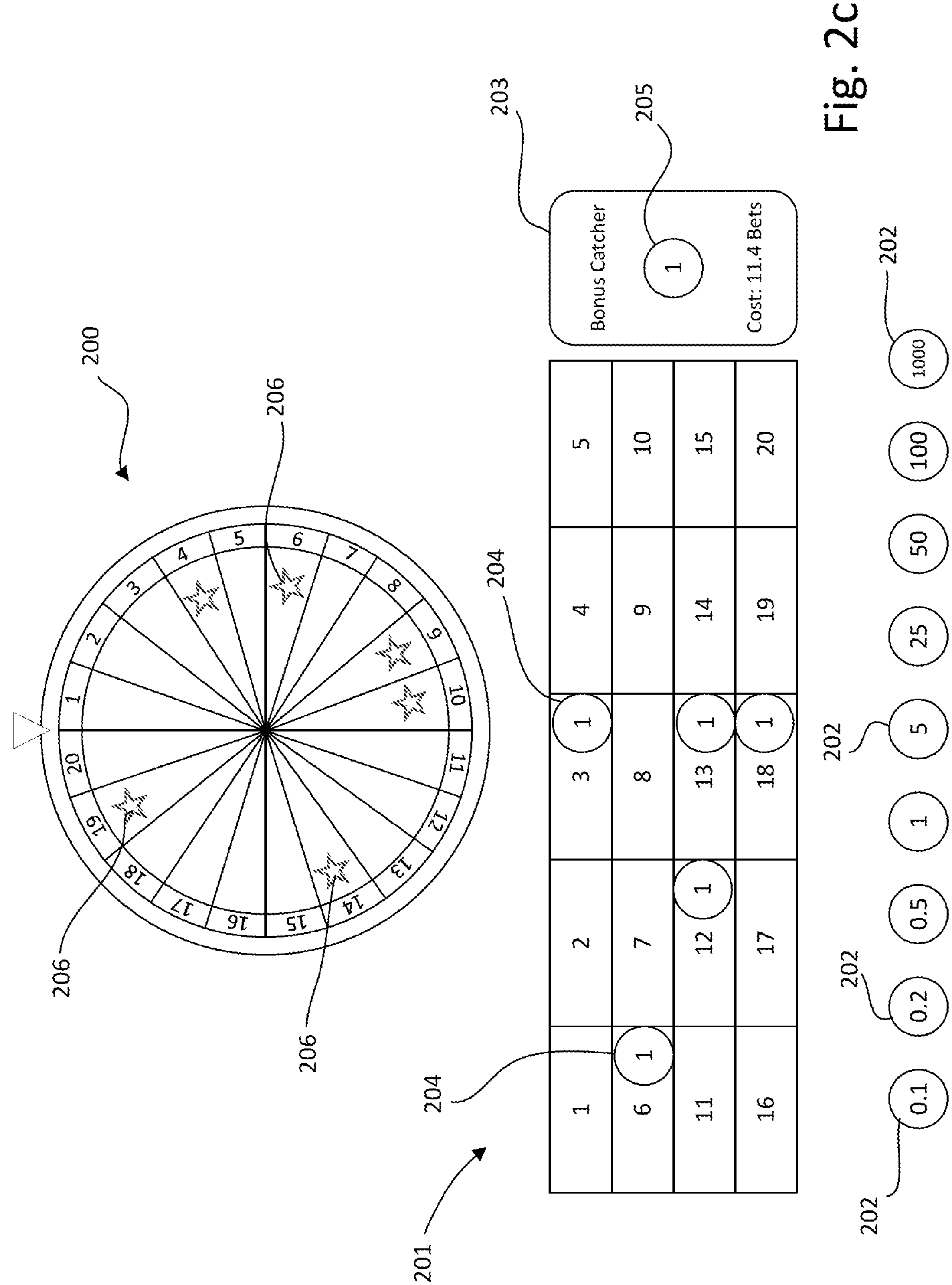

Moving on to FIG. 2*c*, the one or more processors of the server may be configured to randomly assign bonus elements 206 for a subset of outcomes out of the set of possible outcomes, where each bonus element 206 is associated with a bonus game. In the depicted embodiment, 6 bonus elements were assigned. However, as readily understood by the skilled artisan, the number of bonus elements may be different, and may also vary from game round to game round. The outcomes that have a bonus element 206 assigned thereto may be indicated in the graphical user interface presented to the player in a suitable manner (e.g., using animations) and overlaid graphics.

Figure 2D:
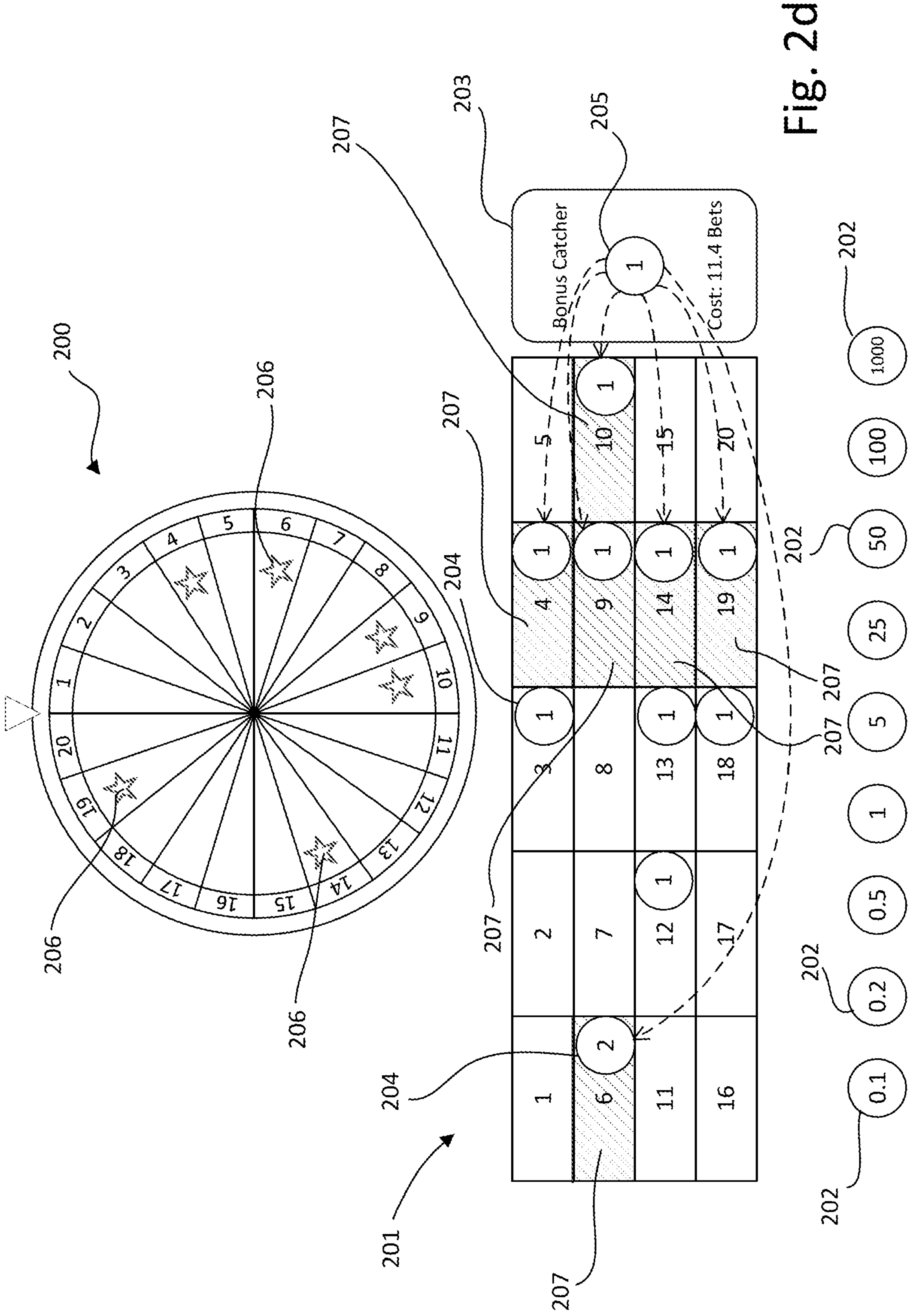

Next, FIG. 2*d* illustrates the effect of the auxiliary wager 205 (i.e., the wager on the bonus catcher field 203). Since a wager was registered on the bonus catcher field 203 (i.e., an "auxiliary wager" 205 was registered), the auxiliary wager amount (1 unit) is registered on each outcome of the subset of outcomes 207 having bonus elements assigned thereto. In other words, the auxiliary wager amount is considered to be placed on each of the outcomes having a bonus element. In the depicted embodiment, 1 unit is accordingly placed on numbers 4, 6, 9, 10, 14, 19. Moreover, since there already was a wager of 1 unit placed on number 6, the wager amount is increased to 2 units on number 6.

Figure 2E:
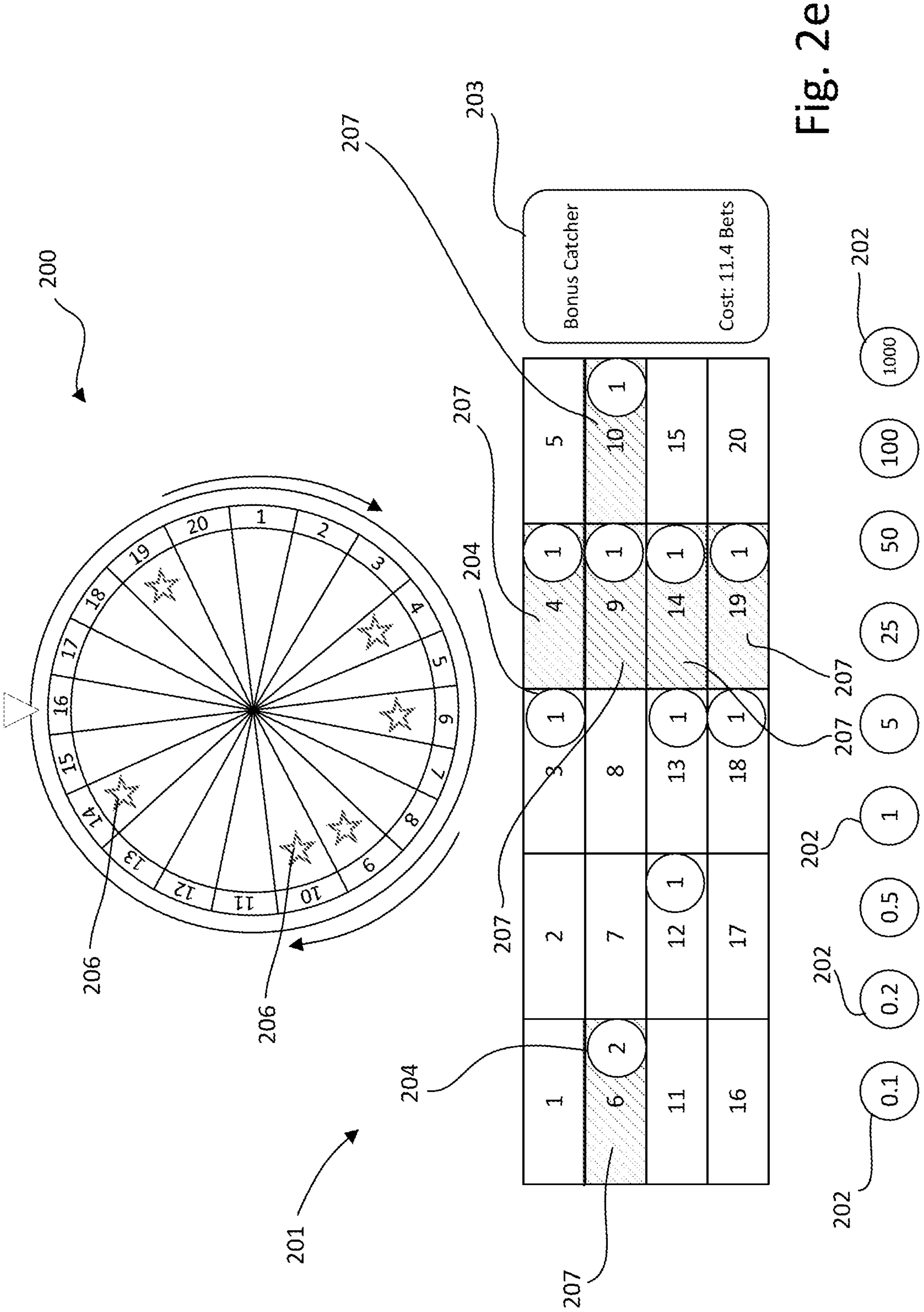

Further, in FIG. 2*e* the main game is launched (wheel 200 is spun) in order to generate a winning outcome. Accordingly, should the wheel 200 stop at any of the numbers having a bonus element 206 assigned thereto (i.e., numbers 4, 6, 9, 10, 14, and 19), the player would proceed to a bonus game for a chance of bonus winnings, where the underlying wager for the bonus game will be the amount that is registered to that number (i.e., 2 units for the bonus game of number 6, and 1 unit for numbers 4, 9, 10, 14, and 19). Should the wheel 200 stop at any of the other wagered outcomes (i.e., numbers 3, 12, 13, and 18), the player will receive a pay-out as defined by the game rules.

Figure 2F:
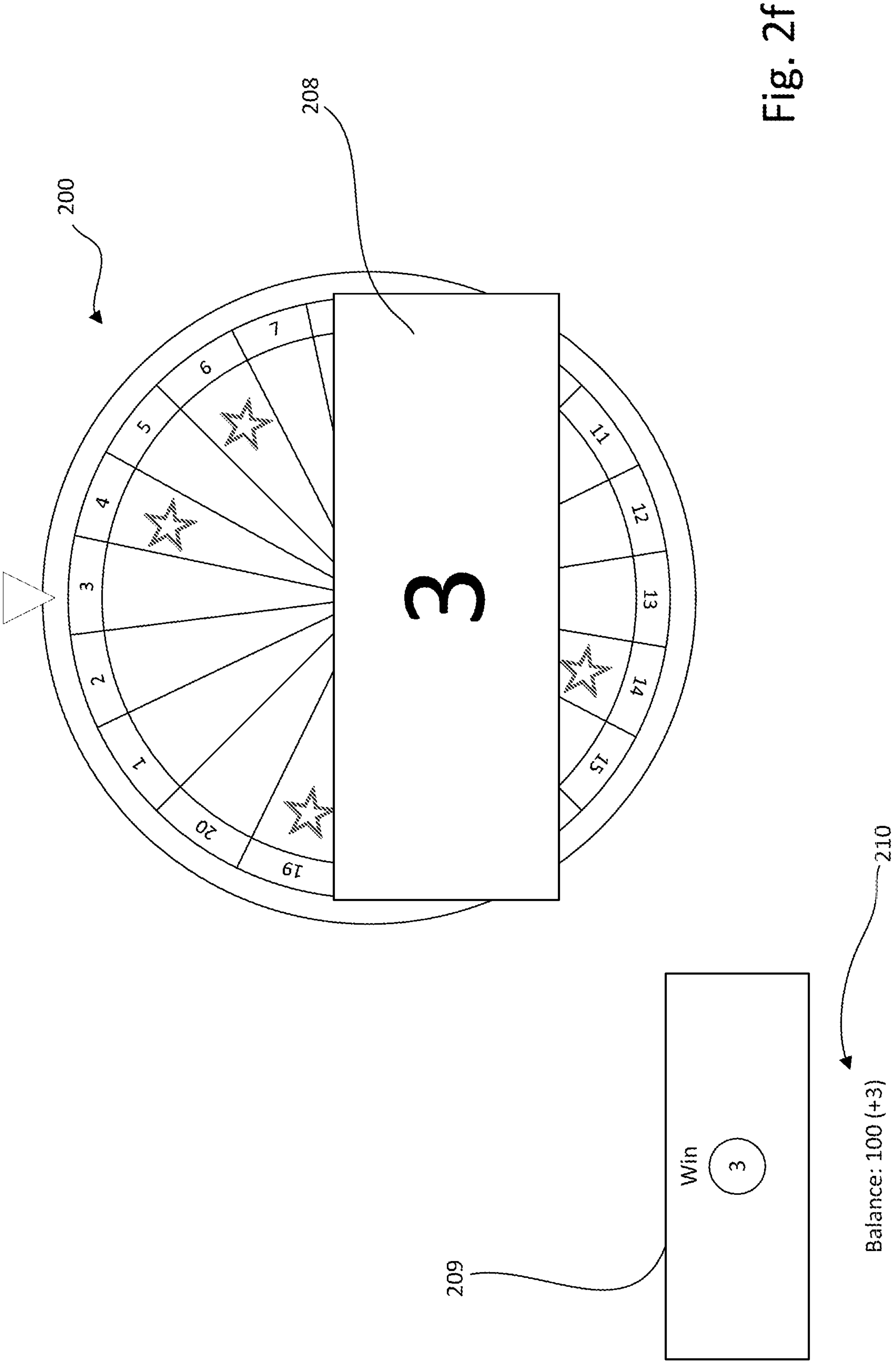

FIG. 2*f* depicts a schematic illustration of a resolution phase for the online casino game, where number 3 is the winning outcome 208. Since a wager of 1 unit was placed on number 3, the player is awarded a pay-out of 3 units (pay-out was 2:1), and the account balance 210 is increased by 3 units.

Accordingly, in some embodiments, the data stream of online casino game content comprises data that causes the remote electronic device to display, via the display apparatus, a graphical user interface comprising a graphical representation. The graphical representation may comprise a live stream of the online casino game 200 comprising, a first plurality of user-interactable graphical elements representing the set of possible outcomes 201, and the bonus catcher field 203. The graphical representation may further comprise a second plurality of graphical elements representing the assigned bonus elements 206, and the winning outcome 208. Here, user-interactable graphical elements may be understood as graphical element with which the user/player may interact (e.g., click on in order to place a bet, remove a bet, etc.).

Figure 3:
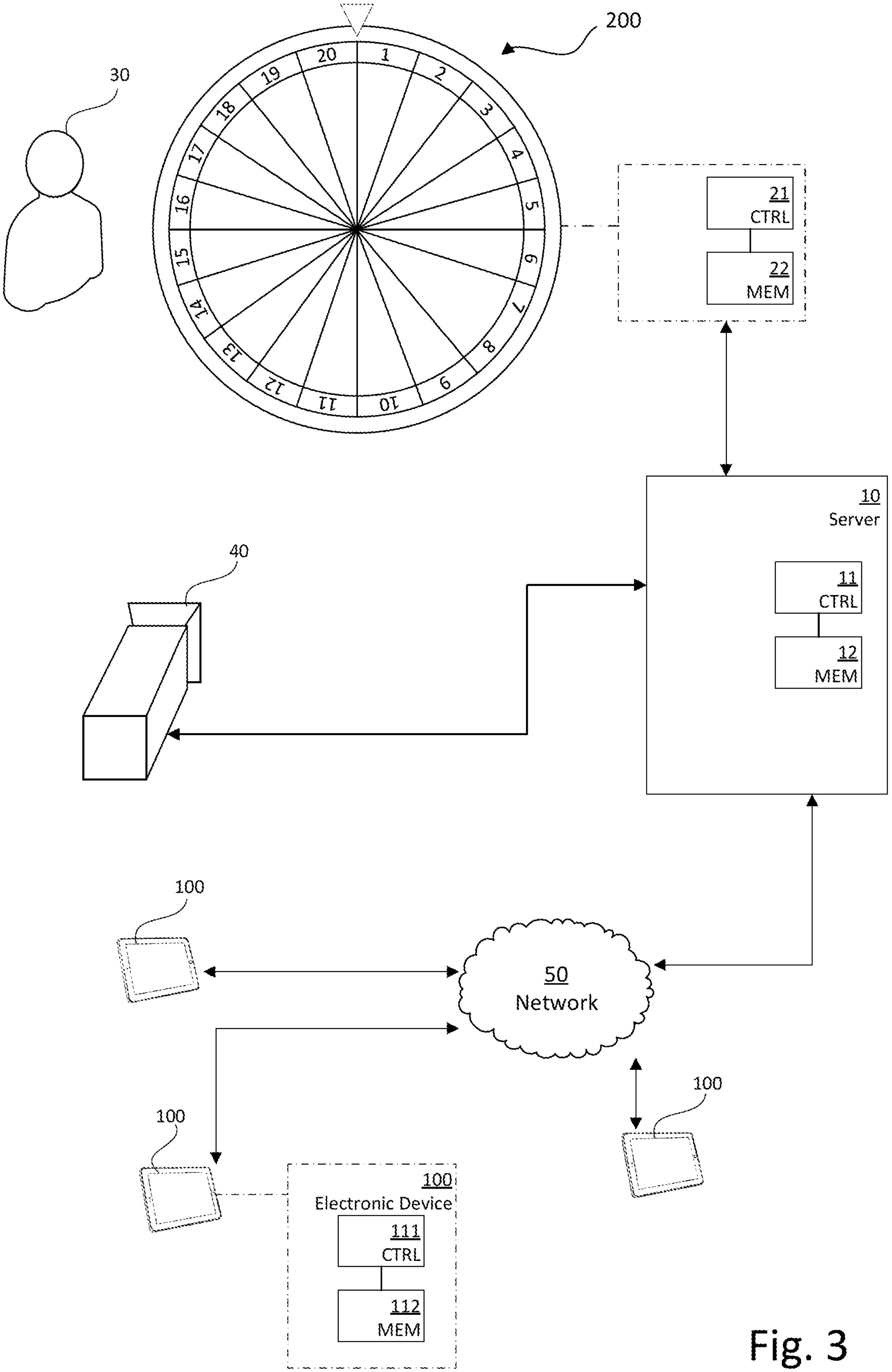
FIG. 3 is a schematic block diagram representation of a system for providing an online casino game in accordance with some embodiments.

FIG. 3 is a schematic block diagram representation of a system for executing a live game. In particular, the system is suitable for providing a live online casino game, such as a live online casino RNG game, to a plurality of remote electronic devices 100. The system comprises a game server 10 having one or more processors 11 (may also be referred to as control circuitry) and one or more data storage devices 12 or memory devices 12. The memory 12 of the game server 10 can include one or more (non-transitory) computer-readable storage mediums, for storing computer-executable instructions, which, when executed by one or more computer processors 11, for example, can cause the game server to perform the techniques described herein. The memory 12 optionally includes high-speed random-access memory, such as DRAM, SRAM, DDR RAM, or other random-access solid-state memory devices, and optionally includes non-volatile memory, such as one or more magnetic disk storage devices, optical disk storage devices, flash memory devices, or other non-volatile solid-state storage devices. Furthermore, the game server 10 may have one or more communication interfaces (not shown) for communicating with peripheral entities or remote entities.

The one or more processors 11 are configured to transmit a data stream of online casino game content to a one or more remote electronic devices 100, here in the form of tablet computers. Each remote electronic device 100 comprises a display apparatus and a user input device (e.g., a touch screen). Moreover, each remote electronic device 100 comprises suitable hardware (e.g., processors 111, memories 112, etc.) and software for executing various software applications as known in the art. The game server 10 and the remote electronic devices 50 are communicatively connected via a communication network 50.

The video stream may for example be a live video feed of a studio where an operator 30 operates a live casino game 20 that is streamed to the one or more remote electronic devices 100 over a communication network (i.e., over the internet) 50. The remote electronic devices 100 may for example be user devices such as smart phones, tablets, personal computers, laptops, or similar. The term "remote" is to be construed as that the electronic devices are remote from a game server 10 associated with the studio where the live game takes place. The online casino game may for example be a virtual or physical RNG game 200, and the data stream may accordingly comprise images captured by a camera 40 arranged to monitor the online casino game 200. In some embodiments, the studio comprises a green screen or blue screen by means of which a virtual RNG game (e.g., virtual wheel) may be overlaid and streamed to the remote electronic devices as known in the art.

Accordingly, in some embodiments, the system comprises a studio presenting a live casino game (such as an RNG game) 200, a camera 40 recording a video stream of the studio, and a server 10 obtaining the video stream and transmitting a data stream including the video stream to a plurality of remote electronic devices 100. Each of the remote electronic devices 100 may comprise one or more processors 111, at least one memory 112, a communication interface, a display, and at least one user input device. The processor 111 of the remote electronic device is arranged to operate instructions sets stored in the memory 112 for displaying the video stream and detecting user input events from the at least one user input device, and further arranged to execute various functions and applications for participating in the live casino game.

The camera 40 may be arranged to record a larger area then just the RNG game 200, for instance a surrounding studio with people 30 and other props being part of the video recorded. The camera 40 can for instance be a dedicated video camera, a DSLR camera with video capabilities, a mirrorless camera with video capabilities, or any other type of image recording device capable of recording video sequences for instance using CMOS or CCD chips. The RNG game 200 may be controlled by a control device comprising one or more processors 21 and one or more memories 22 for generating images or controlling features of the RNG game 23. The control device may operate independently or optionally be controlled by or incorporated into the game server 10.

Further, the one or more processors 11 of the server 10 may be configured to transmit a data stream of online casino game content to a remote electronic device 100 comprising a display apparatus and a user input device. The one or more processors 11 may be further configured to, for each game round of the online casino game 200, register wagers on one or more outcomes out of a set of possible outcomes of the online casino game 200 based on data received from the remote electronic device 100.

Moreover, the one or more processors 11 may be configured to randomly assign bonus elements for a subset of outcomes out of the set of possible outcomes. Here, each bonus element is associated with a bonus game. Further, in response to an auxiliary wager being registered on a bonus catcher field comprised in the online casino game content, the one or more processors 11 may be configured to register the auxiliary wager on each outcome of the subset of outcomes having bonus elements assigned thereto and output a winning outcome out of the set of possible outcomes based on a random number generation.

Moreover, the one or more processors may be configured to, in response to a wager being registered on the winning outcome, increase an account balance of an account associated with the remote electronic device based on a value of the registered wager and a prize value of the winning outcome. In other words, if a player managed to bet on an outcome that was output as a winning outcome, the player is awarded an amount based on the bet and the applied odds.

Further, the one or more processors may be configured to, in response to the winning outcome having a bonus element assigned thereto and a wager being registered on the winning outcome, launch the bonus game associated with the bonus element assigned to the winning outcome. In other words, if the player also managed to place a wager on a "bonus number", the player is awarded a round at a bonus game (e.g., a side game different from the main game) with the wager placed on the "bonus number" in the main game as basis for the bet on the bonus game.

The present invention has been presented above with reference to specific embodiments. However, other embodiments than the above described are possible and within the scope of the invention. Different method steps than those described above, performing the method by hardware or software, may be provided within the scope of the invention. Thus, according to some embodiments, there is provided a non-transitory computer-readable storage medium storing one or more programs configured to be executed by one or more processors of a vehicle control system, the one or more programs comprising instructions for performing the method according to any one of the above-discussed embodiments. Alternatively, according to some embodiments, a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11, 21, 111 (associated with the server 10, control device 20, and remote electronic device 100) may be or include any number of hardware components for conducting data or signal processing or for executing computer code stored in memory 12, 22, 112. The memory 12, 22, 122 may be one or more devices for storing data and/or computer code for completing or facilitating the various methods described in the present description. The memory may include volatile memory or non-volatile memory (e.g., flash-memory). The memory may include database components, object code components, script components, or any other type of information structure for supporting the various activities of the present description. According to an exemplary embodiment, any distributed or local memory device may be utilized with the systems and methods of this description. According to some embodiments the memory is communicably connected to the processor (e.g., via a circuit or any other wired, wireless, or network connection) and includes computer code for executing one or more processes described herein.

It should be noted that any reference signs do not limit the scope of the claims, that the herein disclosed embodiments may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of receiving data indicative of a request to participate and receiving data indicative of a placed bet may be interchanged based on a specific realization. Such variation will depend on the software and hardware systems chosen and on designer choice. All such variations are within the scope of the herein disclosed technology. Likewise, software implementations could be accomplished with standard programming techniques with rule-based logic and other logic to accomplish the various transmission steps, reception steps, calculation steps and execution steps. The above mentioned and described embodiments are only given as examples and should not be limiting to the present invention. Other solutions, uses, objectives, and functions within the scope of the herein disclosed technology as claimed in the below described patent claims should be apparent for the person skilled in the art.

The invention claimed is:

1. A computer-implemented method for providing an online casino game performed by one or more processors of a server, the method comprising:

transmitting a data stream of online casino game content to a remote electronic device;

registering a first wager on a first outcome of a set of possible outcomes of the online casino game based on a first input received from the remote electronic device;

registering an auxiliary wager on a bonus catcher field comprised in the online casino game content based on a second input received from the remote electronic device, the second input comprising a selection of a bonus catcher field comprised in the online casino game content;

randomly assigning bonus elements to a second outcome and to a third outcome of the set of possible outcomes of the online casino game, wherein the bonus elements are associated with a bonus game of the online casino game;

in response to registering the auxiliary wager on the bonus catcher field comprised in the online casino game content and randomly assigning the bonus elements to the second outcome and to the third outcome, registering a second wager on the second outcome and a third wager on the third outcome without receiving any further input from the remote electronic device;

determining a winning outcome out of the set of possible outcomes of the online casino game based on a random number generation; and responsive to determining that the winning outcome is the second outcome or the third outcome, causing the bonus game to be launched on the remote electronic device.

2. The method of claim 1, comprising:

determining a second winning outcome of the set of possible outcomes of the online casino game based on a second random number generation; and responsive to determining that the second winning outcome is the first outcome, increasing an account balance of an account associated with the remote electronic device based on a value of the first wager and a prize value of the first outcome.

3. The method of claim 1, wherein randomly assigning the bonus elements to the second outcome and the third outcome is based on both a second random number generation and a third random number generation.

4. The method of claim 1, wherein the auxiliary wager on the bonus catcher field is based on a cost defined by a predefined cost-formula, and wherein the method comprises:

decreasing an account balance of an account associated with the remote electronic device by a sum of the registered wagers; and in response to the auxiliary wager being registered on the bonus catcher field, decreasing the account balance of the account associated with the remote electronic device by the cost multiplied with the auxiliary wager.

5. The method of claim 1, wherein transmitting the data stream of online casino game content to the remote electronic device causes the remote electronic device to display a graphical user interface comprising:

a graphical representation comprising:

a live stream of the online casino game comprising:

a first plurality of user-interactable graphical elements representing:

the set of possible outcomes; and the bonus catcher field; and a second plurality of graphical elements representing:

the assigned bonus elements; and the winning outcome.

6. The method of claim 1, wherein the random number generation comprises a computer-generated random number generation.

7. The method of claim 1, wherein the random number generation comprises a hardware random number generation.

8. The method of claim 7, wherein the hardware random number generation comprises use of a physical roulette wheel, and wherein the data stream of online casino game content comprises a live stream of the physical roulette wheel.

9. A system for providing an online casino game, the system comprising:

a server comprising one or more processors configured to:

transmit a data stream of online casino game content to a remote electronic device;

register a first wager on a first outcome of a set of possible outcomes of the online casino game based on a first input received from the remote electronic device;

register an auxiliary wager on a bonus catcher field comprised in the online casino game content based on a second input received from the remote electronic device, the second input comprising a selection of a bonus catcher field comprised in the online casino game content;

randomly assign bonus elements to a second outcome and to a third outcome of the set of possible outcomes of the online casino game, wherein the bonus elements are associated with a bonus game of the online casino game;

in response to registering the auxiliary wager on the bonus catcher field comprised in the online casino game content and randomly assigning the bonus elements to the second outcome and to the third outcome, register a second wager on the second outcome and a third wager on the third outcome without receiving any further input from the remote electronic device;

determine a winning outcome out of the set of possible outcomes of the online casino game based on a random number generation; and responsive to determining that the winning outcome is the second outcome or the third outcome, cause the bonus game to be launched on the remote electronic device.

10. The system of claim 9, wherein the one or more processors of the server are configured to:

determine a second winning outcome of the set of possible outcomes of the online casino game based on a second random number generation; and responsive to determining that the second winning outcome is the first outcome, increase an account balance of an account associated with the remote electronic device based on a value of the first wager and a prize value of the first outcome.

11. The system of claim 9, wherein the one or more processors of the server are configured to randomly assign the bonus elements to the second outcome and the third outcome based on both a second random number generation and a third random number generation.

12. The system of claim 9, wherein the auxiliary wager on the bonus catcher field is based on a cost defined by a predefined cost-formula, and wherein the one or more processors of the server are configured to:

decrease an account balance of an account associated with the remote electronic device by a sum of the registered wagers; and in response to the auxiliary wager being registered on the bonus catcher field, decrease the account balance of the account associated with the remote electronic device by the cost multiplied with the auxiliary wager.

13. The system of claim 9, wherein the one or more processors of the server are configured to transmit the data stream of online casino game content to the remote electronic device to cause the remote electronic device to display a graphical user interface comprising:

a graphical representation comprising:

a live stream of the online casino game comprising:

a first plurality of user-interactable graphical elements representing:

the set of possible outcomes; and the bonus catcher field; and a second plurality of graphical elements representing:

the assigned bonus elements; and the winning outcome.

14. The system of claim 9, wherein the random number generation comprises a computer-generated random number generation.

15. The system of claim 9, wherein the random number generation comprises a hardware random number generation.

16. The system of claim 15, wherein the hardware random number generation comprises use of a physical roulette wheel, and wherein the data stream of online casino game content comprises a live stream of the physical roulette wheel.

17. One or more non-transitory computer-readable storage media having instructions stored thereon that, when executed by processing circuitry, cause the processing circuitry to:

transmit a data stream of online casino game content to a remote electronic device;

register a first wager on a first outcome of a set of possible outcomes of the online casino game based on a first input received from the remote electronic device;

register an auxiliary wager on a bonus catcher field comprised in the online casino game content based on a second input received from the remote electronic device, the second input comprising a selection of a bonus catcher field comprised in the online casino game content;

randomly assign bonus elements to a second outcome and to a third outcome of the set of possible outcomes of the online casino game, wherein the bonus elements are associated with a bonus game of the online casino game;

in response to registering the auxiliary wager on the bonus catcher field comprised in the online casino game content and randomly assigning the bonus elements to the second outcome and to the third outcome, register a second wager on the second outcome and a third wager on the third outcome without receiving any further input from the remote electronic device;

determine a winning outcome out of the set of possible outcomes of the online casino game based on a random number generation; and responsive to determining that the winning outcome is the second outcome or the third outcome, cause the bonus game to be launched on the remote electronic device.

18. The computer-readable media of claim 17, wherein the instructions, when executed by the processing circuitry, cause the processing circuitry to:

determine a second winning outcome of the set of possible outcomes of the online casino game based on a second random number generation;

responsive to determining that the second winning outcome is the first outcome, increase an account balance of an account associated with the remote electronic device based on a value of the first wager and a prize value of the first outcome; and randomly assign the bonus elements to the second outcome and the third outcome based on both a third random number generation and a fourth random number generation.

19. The computer-readable media of claim 17, wherein the auxiliary wager on the bonus catcher field is based on a cost defined by a predefined cost-formula, and wherein the instructions, when executed by the processing circuitry, cause the processing circuitry to:

decrease an account balance of an account associated with the remote electronic device by a sum of the registered wagers; and in response to the auxiliary wager being registered on the bonus catcher field, decrease the account balance of the account associated with the remote electronic device by the cost multiplied with the auxiliary wager.

20. The computer-readable media of claim 17, wherein the random number generation comprises use of a physical roulette wheel, and wherein the data stream of online casino game content comprises a live stream of the physical roulette wheel.

* * * * *